United States Patent [19]

Ohashi et al.

[11] Patent Number: 4,973,824
[45] Date of Patent: Nov. 27, 1990

[54] IMAGE FIXING DEVICE

[75] Inventors: Kunio Ohashi; Syoichi Nagata, both of Nara, Japan

[73] Assignee: Sharp Kabushiki Kaisha, Osaka, Japan

[21] Appl. No.: 289,604

[22] Filed: Dec. 23, 1988

[30] Foreign Application Priority Data

Dec. 23, 1987 [JP] Japan .................................. 62-326448

[51] Int. Cl.$^5$ ............................................ G03G 15/20
[52] U.S. Cl. ...................................... 219/216; 355/290
[58] Field of Search ............... 219/216, 469, 470, 471; 355/290

[56] References Cited

U.S. PATENT DOCUMENTS

| | | | |
|---|---|---|---|
| 4,163,892 | 8/1979 | Komatsu | 219/216 |
| 4,223,203 | 9/1980 | Elter | 219/216 |
| 4,242,566 | 12/1980 | Scribner | 219/216 |
| 4,541,705 | 9/1985 | Knechtel | 219/216 |

Primary Examiner—Teresa J. Walberg
Attorney, Agent, or Firm—Flehr, Hohbach, Test, Albritton & Herbert

[57] ABSTRACT

To fix an image formed on a transfer sheet by a developing agent containing a thermoplastic material, an image fixing device includes two contact-type heaters, one of them heating at a temperature below the softening or melting temperature of this thermoplastic material and the other heating at a higher temperature above this softening or melting temperature.

12 Claims, 3 Drawing Sheets

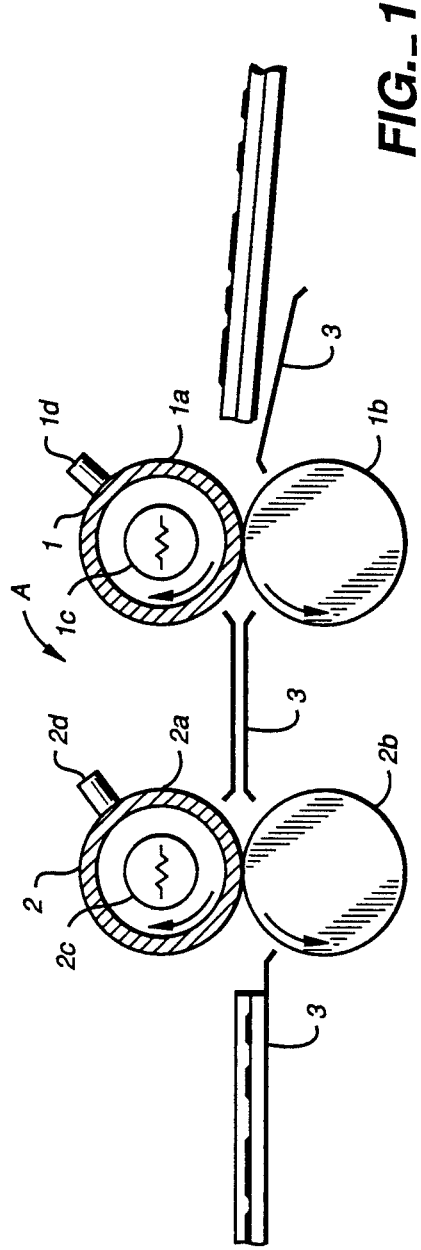
FIG._1
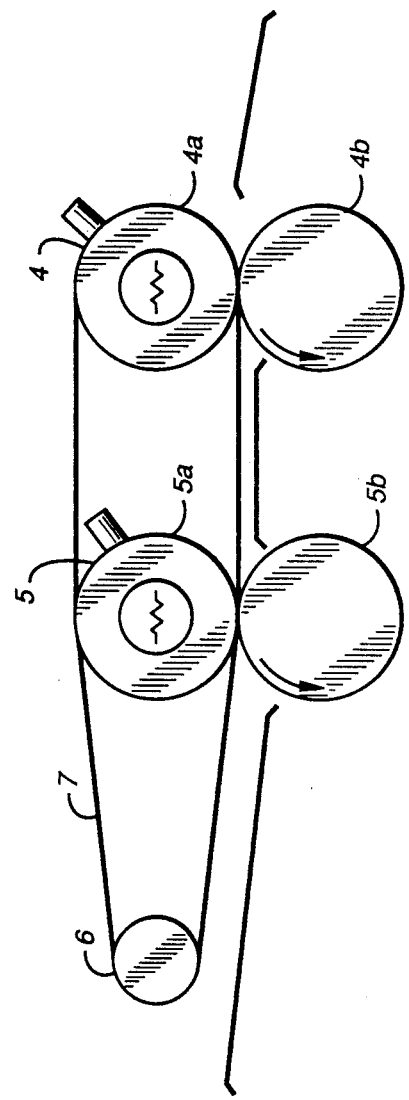
FIG._5

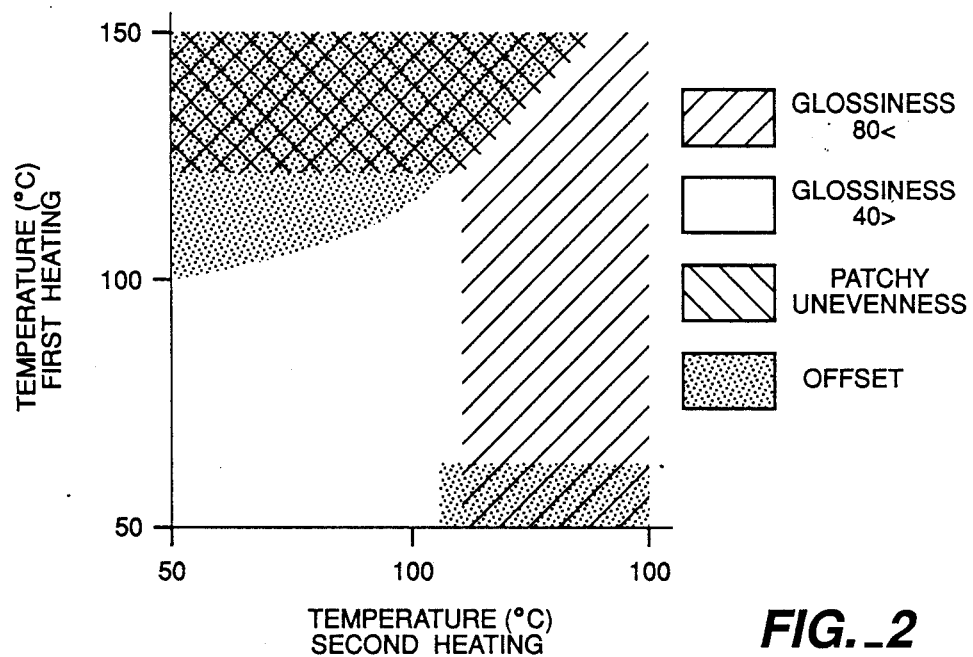
FIG._2
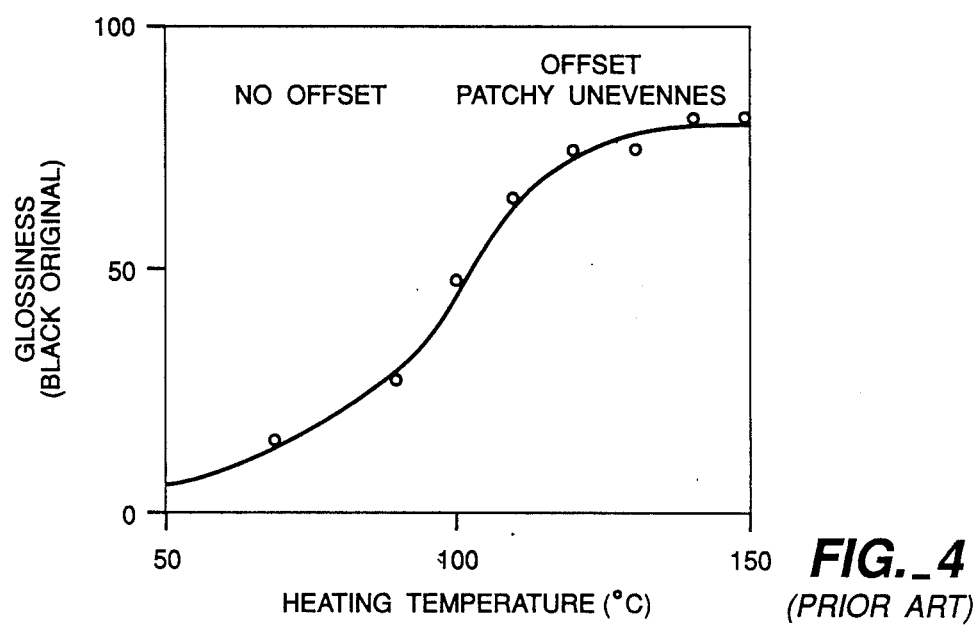
FIG._4 (PRIOR ART)

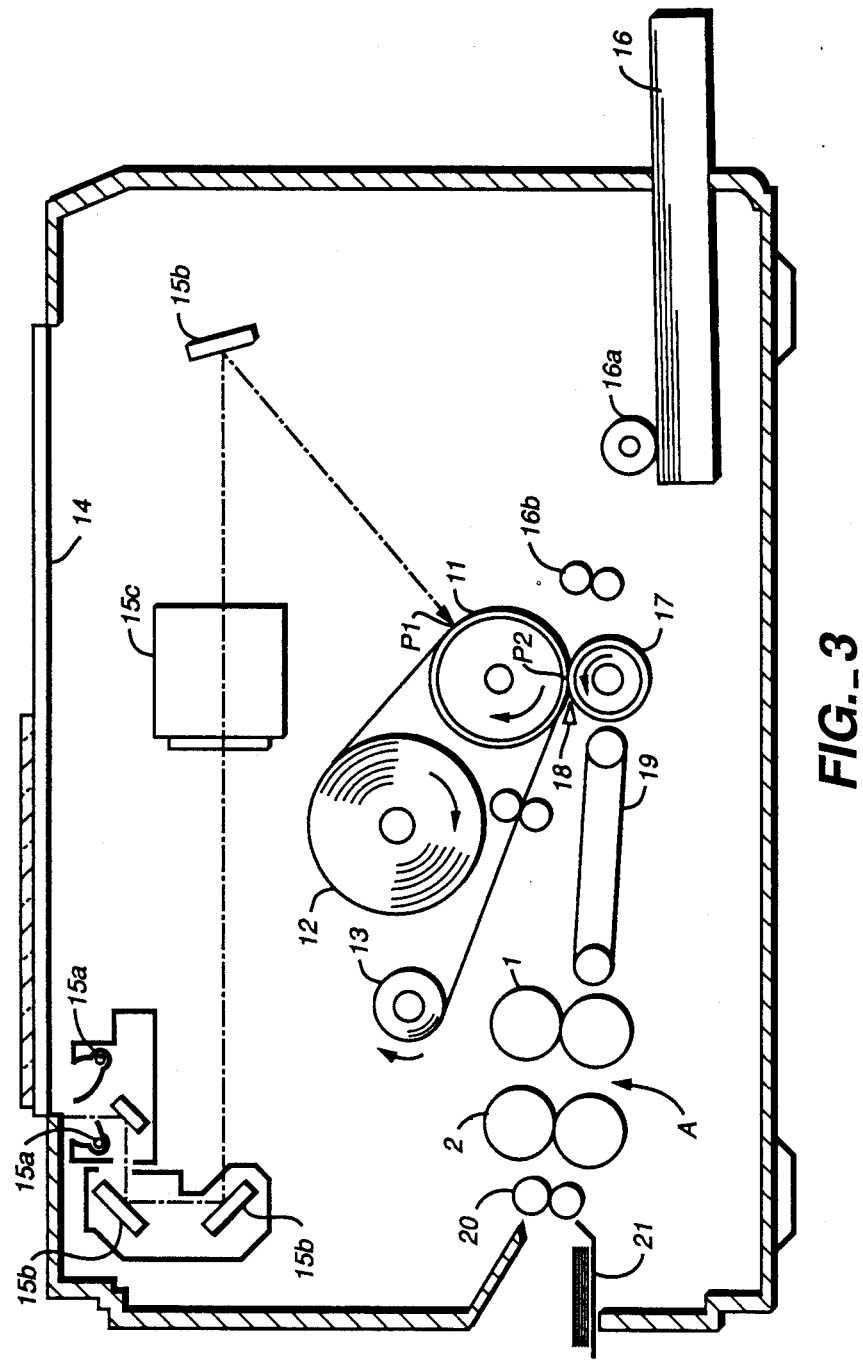
FIG._3

IMAGE FIXING DEVICE

BACKGROUND OF THE INVENTION

This invention relates to an image fixing device for fixing an image formed on a sheet by a developing agent containing a thermoplastic material.

Japanese Pat. Publication Tokkai No. 58-88739 discloses a method of forming an image by using a photosensitive, pressure-sensitive recording (developing) material. According to this method, use is made of a photosensitive sheet with a light-transmissive sheet-like base material coated with microcapsules containing a radiation curable composition and a colorless dye and a transfer sheet coated with a developing agent having a chromogenic effect on this colorless dye and a thermoplastic pigment. If this photosensitive sheet is exposed to an image forming beam of light such as reflected light from an original document to be copied, those of the microcapsules (or the radiation curable composition inside) on the sheet exposed to light become hardened and a latent image corresponding to the original image is formed by the microcapsules which have not been hardened. If this photosensitive sheet and the aforementioned transfer sheet are thereafter superposed one on top of the other and pressed together, the microcapsules which have not been hardened rupture, allowing the colorless dye contained therein to flow out and to form a color image by contacting the developing agent on the transfer sheet.

In such a method for forming images, the chromogenic reaction of the colorless dye usually takes several hours under normal temperatures but can be completed instantaneously if temperature is raised to 60–100° C. (Japanese Pat. Publication Tokkai No. 61-24495). It is also known that the thermoplastic pigment coating the transfer sheet becomes soft or molten when heated to 120–150° C. although this depends somewhat on the kind of pigment and provides glossiness to the image by covering its surface (Japanese Pat. Publication Tokkai No. 60-259490). For this reason, it has been a common practice, after microcapsules are ruptured by pressing a photosensitive sheet and a transfer sheet together, to heat the transfer sheet by using a heater-fixer of a non-contact type such as an oven or a contact-type heater-fixer having a pair of heat and pressure rollers which are mutually opposite to each other in order to accelerate the chromogenic reaction or to provide glossiness to the image.

Non-contact type heater-fixers such as ovens, however, are poor in thermal conductivity efficiency and disadvantageous in that a large heat source is required. Moreover, they tend to cause the transfer sheet to curl up by the heat and hence may be unable to uniformly heat the transfer sheet. If a curled transfer sheet touches the heat source, there is the danger not only of smoking but also of a fire.

By contrast, a heater-fixer of a contact type which fixes an image by means of a pair of heat and pressure rollers are advantageous for having a high thermal conduction efficiency. Since the image is heated while the transfer sheet passes between rollers which are opposite to each other, however, there is the danger of the thermoplastic pigment becoming attached to the rollers to give the effect of offset printing. Although this phenomenon of offset printing can be prevented if the temperature is within a specified range, this temperature range is narrow and it is very difficult to control the heating temperature within such a narrow range. Moreover, a large amount of water, residual solvent and the like in the developing agent (colorless dye, radiation curable material, developing material and thermoplastic pigment) contained in the transfer sheet may be evaporated when heated and if the vapor thus generated is locally gathered between the transfer sheet and the heat roller, parts of the transfer sheet may not be heated sufficiently. If this happens and parts of the image are not heated sufficiently, the chromogenic reaction of the colorless dye becomes non-uniform and an image with color irregularities may be obtained. If the thermoplastic pigment cannot completely cover the surface of the chromogenic image, an image with irregularities in glossiness may result.

SUMMARY OF THE INVENTION

This invention relates to an image fixing device which uses a developing agent containing a thermoplastic material to fix an image formed on a sheet by heating and is characterized as being comprised of a first heating section of a contact type for heating below the melting temperature of the thermoplastic material and a second heating section of a contact type for heating above the softening or melting temperature of the thermoplastic material and higher than the temperature of the first heating section. According to a preferred embodiment of the present invention, both the first and second heating sections are comprised of a heat roller and a pressure roller which is either directly or indirectly pressed against the heat roller. According to another preferred embodiment of the present invention, the surfaces of the heat rollers of the first and second heating sections are both coated with polytetrafluoroethylene commonly known as Teflon. According to still another preferred embodiment of the present invention, an endless belt is stretched around the heat rollers of the first and second heating sections.

With an image fixing device thus structured according to the present invention, an image on a sheet can be heated uniformly and with a high thermal conduction efficiency because both the first and second heating sections are of a contact type. As a result, chromogenic and toner images on a sheet can be made even and the image can be provided with a high level of glossiness. Since heating is carried out separately twice according to the present invention, furthermore, there is no danger of water vapor or vapor of a solvent accumulating between the heating device and the sheet on which an image is being fixed. As a result, there is no local unevenness in color on the fixed image and it is possible to obtain a uniformly glossy image. In addition, occurrence of offset development can be prevented and this means that there is no need to take the trouble of removing the developing agent attached to the rollers, etc. Thus, there is no need, for example, to provide a cleaning means for removing the developing agent from the rollers and the structure of the device can be simplified. This, in turn, has the favorable effect of reducing the production cost of the device.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a schematic side view of an image fixing device embodying the present invention, FIG. 2 is a graph for showing the evaluated quality of images obtained by a copier incorporating the image fixing device of FIG. 1, FIG. 3 is a schematic structural diagram of a copier incorporating the image fixing device of FIG. 1, FIG. 4 is a graph for showing the evaluated quality of images obtained by a copier incorporating a prior art image fixing device, and FIG. 5 is a schematic drawing of an image fixing device according to another embodiment of the present invention.

DESCRIPTION OF PREFERRED EMBODIMENTS

With reference to FIG. 3 which schematically shows the structure of a copier having an image fixing device embodying the present invention, a main drum 11 is disposed approximately at the center of its housing. A photosensitive sheet roller 12 for winding an unused photosensitive sheet therearound in the form of a roll and a take-up roller 13 for winding up used parts of the photosensitive sheet are disposed at one side of the main drum 11. This photosensitive sheet wound around the photosensitive sheet roller 12 is comprised of a sheet-like base material with one surface thereof coated with microcapsules containing a radiation curable material and a colorless dye. The photosensitive sheet is pulled out of the photosensitive sheet roller, wrapped around the main drum with its microcapsule-coated surface facing outwardly and then taken up by the take-up roller 13.

A document table 14 is provided at the top surface of the copier housing structure and an optical system including a light source 15a, mirrors 15b and a lens 15c is disposed below the document table 14. The optical system serves to expose an original document placed on the document table 14 and the reflected light from the original document is directed to an exposure point P1 defined on the surface of the main drum 11. Parts of the microcapsules coating the photosensitive sheet wrapped around the main drum 11 are thereby exposed to light and are hardened, there being formed a latent image corresponding to the image on the original document by those of the microcapsules which have not been hardened.

On one side surface of the copier housing structure is a cassette 16 for containing image transfer sheets therein. The transfer sheets placed inside this cassette 16 are comprised of a sheet-like base material with one of its surfaces coated with a thermoplastic material and a developing agent capable of causing a chromogenic reaction of the colorless dye encapsulated inside the microcapsules of the photosensitive sheet. These transfer sheets stored inside the cassette 16 are taken out thereof one sheet at a time by means of a feeder roller 16a and temporarily stopped in contact with timing rollers 16b disposed between the feeder roller 16a and the main drum 11. The timing rollers 16b are activated at a predetermined timing, thereby leading the temporarily stopped transfer sheet to the main drum 11.

Disposed below the main drum 11 is a pressure roller 17 which is compressed directly against the main drum 11 at a compression point P2 by means of a compression mechanism (not shown). The compression point P2 is between the main drum 11 and the pressure roller 17 and this is where the microcapsule-coated surface of the photosensitive sheet and the surface of the transfer sheet coated with the developing agent are superposed against each other and compressed together. The timing rollers 16b are activated in such a way that the front edge of the exposed area of the photosensitive sheet by the optical system coincides at this compression point P2 with the front edge of the transfer sheet transported from the timing rollers 16b. When the photosensitive sheet and the transfer sheet which are superposed one on top of the other are compressed together between the main drum 11 and the pressure roller 17, those of the microcapsules on the photosensitive sheet which have not been hardened rupture and cause the colorless dye to flow out thereof. This causes a chromogenic reaction with the developing agent on the transfer sheet.

Thereafter, the transfer sheet is separated from the photosensitive sheet by means of a separator blade 18 and transported to an image fixing device A of the present invention by means of a suction belt 19. The image fixing device A serves to fix the image formed on the transfer sheet and the transfer sheet with the image thus fixed is discharged onto a discharge tray 21 by means of discharge rollers 20.

With reference next to FIG. 1, the image fixing device A embodying the present invention is comprised of a first heating section 1 and a second heating section 2. Both the first heating section 1 and the second heating section 2 are comprised of a cylindrical heat roller 1a and 2a with a Teflon coated surface and a pressure roller 1b and 2b with a surface having a silicone rubber layer.

The heat rollers 1a and 2a each contain therein a heat-emitting member composed, for example, of a halogen tungsten lamp 1c or 2c axially along its entire length such that the surfaces of the heat rollers 1a and 2a can be uniformly heated by these lamps 1c and 2c. Temperature sensors 1d and 2d are provided on the surfaces of the heat rollers 1a and 2a and the heating temperatures of the halogen tungsten lamps 1c and 2c are controlled according to the temperatures detected by these sensors 1d and 2d.

The heat rollers 1a and 2a are connected to their respective driving means (not shown) so as to be rotated in the directions shown by arrows. The pressure rollers 1b and 2b are directly in contact with the associated heat rollers 1a and 2a, respectively, by pressure applying means (not shown). In FIG. 1, numerals 3 indicate guide pieces for transporting paper sheets therealong.

When use is made of the image fixing device of the present invention as described above for heating a transfer sheet upon which a chromogenic image has been formed, the sheet is heated first below the melting temperature by the heat roller 1a of the first heating section 1. This has the effect of accelerating the chromogenic reaction of the colorless dye flowing out onto the transfer sheet with the developing agent thereon but the thermoplastic material (pigment) coating the transfer sheet is neither softened or melted but remains solid. In the meantime, moisture in the transfer sheet and a part of the solvent, etc. remaining on the transfer sheet evaporate.

Next, the transfer sheet is heated by the heat roller 2a of the second heating section 2 to a level beyond the softening or melting temperature of the thermoplastic material. As a result, the thermoplastic material is softened or melted and comes to cover the surface of the chromogenic image to provide glossiness to the image. Since the transfer sheet is heated at this time while it is compressed between the heat roller 2a and the pressure roller 2b of the second heating section 2, the surface of the thermoplastic pigment is flattened and this further adds lustre to the image. Heating at the second heating section 2 further causes evaporation of moisture from the transfer sheet as well as the residual solvent, etc.

In summary, since the moisture contained in the transfer sheet and the residual solvent, etc. are evaporated on two separate occasions by the first heating section 1 and the second heating section 2, their quantities become extremely small and they do not remain locally on the surfaces of the heat rollers 1a and 2a. Since the first and second heating sections 1 and 2 are both of a contact type, furthermore, transfer sheets are prevented from curling up and there is no danger of fire or smoking. As described above, the thermoplastic material is softened or melted to cover the surface of a chromogenic image by the second heating section 2 after moisture and the solvent are already removed partially by the first heating section 1. This has the favorable effect of preventing the aforementioned offset because this phenomenon would occur only if the temperature of the thermoplastic material were higher than that of the heat roller.

Copies were made by using a copier incorporating an image fixing device as described above and the quality of the image thus obtained was evaluated. For the testing, use was made of an original with a black surface, the rotational speed of the heat rollers 1a and 2a (= the traveling speed of the transfer sheet) was 20 mm/sec, the pressure by the pressure rollers 1b and 2b was 40 kg/cm 2 and the temperatures of the heat rollers 1a and 2a were varied within the range of 50-150° C. Glossiness (75-degree mirror surface glossiness according to JISZ-8741), occurrence of color irregularities and presence of offset were evaluated by using copies fixed under the conditions given above. FIG. 2 shows the results of the evaluation.

FIG. 2 shows that the thermoplastic material was not sufficiently softened or melted if the first and second heating sections 1 and 2 were both below about 100° C. and hence that a sufficiently glossy image could not be obtained because the surface of the chromogenic image could not be covered completely. If the first heating section 1 was about 60° C. and the second heating section 2 was above about 100-110° C. (above the softening or melting temperature of the thermoplastic material), occurrence of the phenomenon of offset was observable. This was because moisture and residual solvent, etc. were not sufficiently removed (evaporated) by the first heating section 1 and the condition was then conducive to the offset phenomenon. If the first heating section 1 and the second heating section 2 were both above about 100-110° C., the results were not good because both local unevenness in color and offset phenomena appeared. This was because the amount of moisture and residual solvent, etc. was large at the first heating section 1 and the vapor generated therefrom was trapped between the heat roller of the first heating section and the transfer sheet (just as in the case of a prior art heat roller), causing insufficient heating locally. A high-quality image was obtainable according to the present invention because the temperature of the first heating section was about 70-100 C. such that moisture and residual solvent, etc. were partially evaporated but the thermoplastic material was neither softened nor melted while the temperature of the second heating section was about 110-150° C. such that the thermoplastic material was softened or melted and covered the surface of the chromogenic image. It was also found by testing that evaluation results of fixed images similar to that shown in FIG. 2 are obtained if the traveling speed of the transfer sheet inside the image fixing device of the present invention is within the range of 3-100 mm/sec.

For the purpose of comparison, copies were obtained by using a similar black original document on a copier having a prior art image fixing device with a single pair of heat roller and pressure roller which are disposed opposite each other. The traveling speed of transfer sheets was 20 mm/sec, the pressure applied by the pressure roller was 40 kg/cm 2 and the temperature was varied within the range of 50-150° C. The results of evaluation are shown in FIG. 4.

One learns from FIG. 4 that offset did not occur when the temperature was below 115° C. but that glossiness (75-degree mirror surface glossiness) was less than 70, which is too low to be satisfactory. Glossiness of greater than about 80 could be obtained by raising the temperature above 115° C. but color unevenness occurred in the image due to the vapor of water, solvents, etc. and glossiness in such uneven areas was less than 40. In other words, the image was unsightly as a whole with glossy areas mixed with areas of low glossiness. The phenomenon of offset frequently occurred at temperatures exceeding 130° C. In the temperature range of 100-130° C., it sometimes occurred and sometimes did not occur, the situation being extremely unstable.

FIG. 5 shows another image fixing device A embodying the present invention. In FIG. 5, numeral 4 indicates a first heating section with a heat roller 4a and a pressure roller 4b and numeral 5 indicates a second heating section with a heat roller 5a and a pressure roller 5b. The surfaces of the heat rollers 4a and 5a are not Teflon-coated and there is disposed on the downstream side of the heat rollers 4a and 5a with respect to the direction of travel of the transfer sheet is a separator roller 6 with diameter smaller than that of the heat rollers 4a and 5a. An endless belt 7 is wrapped around the heat rollers 4a and 5a and the separator roller 6. The pressure rollers 4b and 5b respectively of the first and second heating sections 4 and 5 are compressed against the associated heat rollers 4a and 5a through this endless belt 7. The endless belt 7 is made of a material with high surface smoothness and heat resistance. Use may be made, for example, of a polyimide resin or a nickel alloy.

Through an image fixing device thus structured, a transfer sheet is transported along the endless belt 7 and is heated while passing between the heat roller 4a and the pressure roller 4b of the first heating section 4 and between the heat roller 5a and the pressure roller 5b of the second heating section 5. This accelerates the chromogenic reaction of the colorless dye on the transfer sheet and the thermoplastic material serves to make a glossy image. As the transfer sheet is transported by the endless belt 7 and reaches the position of the separator roller 6, it becomes separated from the endless belt 7 by the curvature of the roller (that is, by the force with which the endless belt 7 is wound upward) as well as by the stiffness of the transfer sheet itself. The diameter of the separator roller 6 is preferably about 6-40 mm such that the transfer sheet can be easily separated and the occurrence of offset can also be prevented effectively.

A copier incorporating an image fixing device as described above was used for testing to obtain copies of a black original. The endless belt was made of polyimide and 0.1 mm in thickness. The velocity of travel of transfer sheet was 20 mm/sec, the pressure applied by the pressure rollers was 40 kg/cm 2, and the heating temperature was varied within the range of 50–150° C. The results of evaluation was approximately the same as shown in FIG. 2 except glossiness in excess of 90 was obtained with the use of an endless belt. In short, extremely high-quality images could be obtained by using an image fixing device according to this embodiment of the present invention using an endless belt.

In summary, the present invention teaches that occurrence of offset and local unevenness can be prevented and high-quality images can be obtained if two heating sections are used in the fixing device for heating at two separate times.

What is claimed is:

1. In an image fixing device for heating an image transfer sheet to fix an image formed thereon by a developing agent containing a thermoplastic material, the improvement wherein said image fixing device comprises
    a first contact-type heating means for heating a sheet at a temperature below the softening or melting temperature of a thermoplastic material on said sheet, and
    a second contact-type heating means disposed adjacent to said first heating means for heating said sheet at another temperature high than that of said first heating means and high than the softening or melting temperature of said thermoplastic material, said sheet being directed immediately from said first heating means to said second heating means.

2. The image fixing device of claim 1 wherein said first heating means and said second heating means each comprise a heat roller and a pressure roller which is directly or indirectly compressed against said heat roller.

3. The image fixing device of claim 2 wherein said heat rollers of said first and second heating means each have a surface coated with polytetrafluoroethylene.

4. The image fixing device of claim 2 further comprising an endless belt wrapped around said heat rollers of said first and second heating means.

5. The image fixing device of claim 1 further comprising sheet guiding means disposed between said first and second heating means, for directing said sheet immediately from said first heating means to said second heating means.

6. In an image fixing device for heating an image transfer sheet to fix an image formed thereon by a developing agent containing a thermoplastic material, the improvement wherein said image fixing device comprises
    a first contact-type heating means for heating a sheet at a temperature below the softening or melting temperature of a thermoplastic material on said sheet,
    a second contact-type heating means for heating said sheet at another temperature high than that of said first heating means and high than the softening or melting temperature of said thermoplastic material, said first and second heating means each comprising a heat roller and a pressure roller which are directly or indirectly compressed against each other, and
    an endless belt wrapped around said heat rollers of said first and second heating means.

7. The image fixing device of claim 6 further comprising a separator roller which is smaller than said heat rollers and is disposed adjacent to said heat roller of said second heating means distal from said first heating means, said endless belt being also wrapped around said separator roller.

8. The image fixing device of claim 6 wherein said endless belt is made of a material with high surface smoothness and heat resistance.

9. The image fixing device of claim 8 wherein said endless belt is made of polyimide resin.

10. The image fixing device of claim 8 wherein said endless belt is made of a nickel alloy.

11. The image fixing device of claim 7 wherein the diameter of said separator roller is 6–40 mm.

12. The image fixing device of claim 6 further comprising sheet guiding means disposed between said first and second heating means for directing said sheet immediately from said first heating means to said second heating means.

* * * * *